US007006342B2

(12) United States Patent
Williams et al.

(10) Patent No.: US 7,006,342 B2
(45) Date of Patent: Feb. 28, 2006

(54) VARIABLE CAPACITOR HAVING A RIGIDITY-INCREASING FEATURE

(75) Inventors: Kirt R. Williams, Portola Valley, CA (US); Farid Matta, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/458,005

(22) Filed: Jun. 9, 2003

(65) Prior Publication Data

US 2004/0246654 A1  Dec. 9, 2004

(51) Int. Cl.
 *H01G 7/00* (2006.01)
 *H01G 7/06* (2006.01)
(52) U.S. Cl. ..................... 361/281; 361/277
(58) Field of Classification Search ........... 361/277, 361/280–281, 283.1, 287, 290, 291–292
 See application file for complete search history.

(56) References Cited

U.S. PATENT DOCUMENTS

| | | | | |
|---|---|---|---|---|
| 5,959,516 A | * | 9/1999 | Chang et al. | 334/14 |
| 6,151,966 A | * | 11/2000 | Sakai et al. | 73/514.32 |
| 6,661,069 B1 | * | 12/2003 | Chinthakindi et al. | 257/415 |
| 2003/0125214 A1 | * | 7/2003 | Eden et al. | 505/210 |
| 2003/0210511 A1 | * | 11/2003 | Sakai et al. | 361/287 |

OTHER PUBLICATIONS

Jun-Bo Yoon, et al.; "A High-Q Tunable Micromechanical Capacitor with Movable Dielectric for RF Applications"; Technical Digest, IEEE Int. Electron Devices Meeting; pp. 489-492, Dec. 2000.

Nathan Bushyager, et al.; "A Novel Adaptive Approach to Modeling MEMS Tunable Capacitors Using MRTD and FDTD Techniques", no date.

Darrin Young, et al.; "A Monolithic Micromachined RF Low-Noise VCO"; http://buffy.eecs.berkeley.edu/iro/summary/97abstracts/dyoung.1.html; pp. 1-3, Dec. 2002.

Aleksander DEC, et al.; "Micromachined Electro-Mechanically Tunable Capacitors and Their Applications to RF IC'S"; IEEE Transactions on Microw ave Theory and Techniques, vol. 46, No. 12, Dec. 1998; pp. 2587-2596.

* cited by examiner

Primary Examiner—Eric W. Thomas

(57) ABSTRACT

A variable capacitor. The variable capacitor has a movable capacitor electrode including a major surface and a fixed capacitor electrode including a major surface. The major surface of the fixed capacitor electrode is opposite the major surface of the movable capacitor electrode and is separated therefrom by a gap. The major surface of the movable capacitor electrode includes a rigidity-increasing feature. The rigidity-increasing feature further provides a capacitance-increasing topography and reduces snap-together of the capacitor electrodes.

16 Claims, 4 Drawing Sheets

VARIABLE CAPACITOR HAVING A RIGIDITY-INCREASING FEATURE

TECHNICAL FIELD

Embodiments in accordance with the present invention relate to the field of variable capacitors. Specifically, embodiments in accordance with the present invention relate to a variable capacitor with a movable capacitor electrode having a rigidity-increasing feature.

BACKGROUND ART

It is desirable for many applications to have a tunable integrated circuit capacitor. For example, communication devices have a need for voltage controlled oscillators (VCO). Micro-electro-mechanical systems (MEMS) provide a way to construct a variable capacitor within an integrated circuit. Conventionally, a parallel-plate micromachined variable capacitor is fabricated by forming a fixed capacitor electrode on a substrate, and forming a movable capacitor electrode that is held in place parallel to the fixed capacitor electrode by a system of springs. By applying a control voltage between the fixed and movable capacitor electrodes, the movable capacitor electrode is pulled towards the fixed capacitor electrode due to the electrostatic force between the two capacitor electrodes. Because the capacitance of a parallel-plate capacitor is inversely proportional to the distance between the electrodes, the capacitance is altered by changing the distance between the electrodes. In addition to the control voltage, a signal voltage is applied to the capacitor electrodes. The signal voltage is the voltage applied to the capacitor for the purposes of the circuit in which the tunable capacitor resides. Typically, the control voltage is a large DC signal, whereas the signal voltage is a small AC signal. However, the control voltage can be an AC signal with a frequency above the frequency at which the movable capacitor electrode/spring system has a significant mechanical response.

A problem with conventional parallel-plate micromachined variable capacitors is keeping the distance between the movable and fixed capacitor electrodes uniform across the opposed surfaces of the capacitor electrodes. The movable capacitor electrode tends to bend. For example, conventionally, the movable capacitor electrode is supported by springs that are anchored to the substrate. Temperature variations cause the movable capacitor electrode and the substrate material to expand by different amounts. This can cause the movable capacitor electrode to bend either convexly or concavely. Consequently, the distance between the two capacitor electrodes is non-uniform across the surface of the electrodes. Moreover, because the movable capacitor electrode can bend either convexly or concavely, the capacitance of the device either decreases or increases unpredictably. Further, bending can occur during fabrication of the capacitor, (due to variations in the internal stresses of the deposited materials,) resulting in a deformed movable capacitor electrode. A deformed capacitor electrode will not have the capacitance for which it was designed.

The amount by which the capacitance of conventional parallel-plate micromachined variable capacitors can be varied is limited. Moreover, such capacitors are susceptible to a snap-together effect in which the movable capacitor electrode snaps into contact with the fixed capacitor electrode if the two capacitor electrodes get too close together. That is, when controlling the movable capacitor electrode, the electrostatic force due to the control voltage works against the force from the system of springs connected to the movable capacitor electrode. When the capacitor electrodes get too close together, the electrostatic force overwhelms the force from the springs, and the capacitor electrodes snap together. This is because the electrostatic force increases proportional to $1/x^2$, whereas the spring force increases proportional to $\Delta x$, where "x" is the distance between the capacitor electrodes and $\Delta x$ is the distance moved. Snap-together typically occurs when the movable capacitor electrode has moved about ⅓ of the initial gap, at which point the capacitance increase is about 50 percent. Thus, conventional parallel plate variable capacitors typically have a maximum tuning range of about 1.5:1 between the capacitance at snap-together and the initial minimum capacitance. However, because the movable electrode could be deformed and also has a tendency to bend, snap-together can occur even if the movable capacitor electrode has moved less that ⅓ of the initial gap. The snap-together effect prevents achieving a larger change in capacitance that would otherwise be achievable if the capacitor electrodes could be brought closer together. Moreover, if the capacitor electrodes do snap together, a high current can flow that could damage other components in the integrated circuit.

Thus, one problem with conventional parallel-plate variable capacitors is that the movable capacitor electrode is subject to bending, so that the capacitance changes unpredictably. Another problem with conventional parallel-plate variable capacitors is that the range of capacitance is too limited due to the snap-together effect. Still another problem with conventional parallel-plate variable capacitors is that components can be damaged if the capacitor electrodes short together.

DISCLOSURE OF THE INVENTION

The present invention pertains to a variable capacitor. An embodiment in accordance with the invention provides a variable capacitor comprising a movable capacitor electrode including a major surface and a fixed capacitor electrode including a major surface. The major surface of the fixed capacitor electrode is opposite the major surface of the movable capacitor electrode and is separated therefrom by a gap. The major surface of the movable capacitor electrode includes a rigidity-increasing feature. The rigidity-increasing feature further provides a capacitance-increasing topography and reduces snap-together of the capacitor electrodes. Reducing snap-together increases the tuning range of the capacitor.

Another embodiment provides a method of reducing snap-together between a movable capacitor electrode and a fixed capacitor electrode in a variable capacitor. The method comprises forming a fixed capacitor electrode having a major surface. The method further comprises forming a movable capacitor electrode having a major surface with a rigidity-increasing feature that reduces snap-together of the capacitor electrodes. The major surface of the movable capacitor electrode is formed opposite the major surface of the fixed capacitor electrode.

Embodiments in accordance with the invention provide a variable capacitor that has a rigid movable capacitor electrode that reduces the likelihood that movable capacitor electrode will bend, thus the distance between the capacitor electrodes is kept more uniform and predictable than conventional solutions. Embodiments in accordance with the invention provide a variable capacitor whose electrodes do not snap together as readily as conventional flat parallel-plate variable capacitors. Embodiments in accordance with the invention provide a variable capacitor with a major surface of a movable capacitor electrode and a major surface of a fixed capacitor electrode that each have a capacitance-increasing topography. In this fashion, a greater capacitance is achieved than conventional flat parallel-plate variable capacitors occupying the same chip area. Embodiments in accordance with the invention provide a variable capacitor having a greater capacitance range than conventional flat parallel-plate variable capacitors.

BRIEF DESCRIPTION OF THE DRAWINGS

The accompanying drawings, which are incorporated in and form a part of this specification, illustrate embodiments according to the invention and, together with the description, serve to explain the principles of the invention.

DETAILED DESCRIPTION OF THE INVENTION

Figure 1:
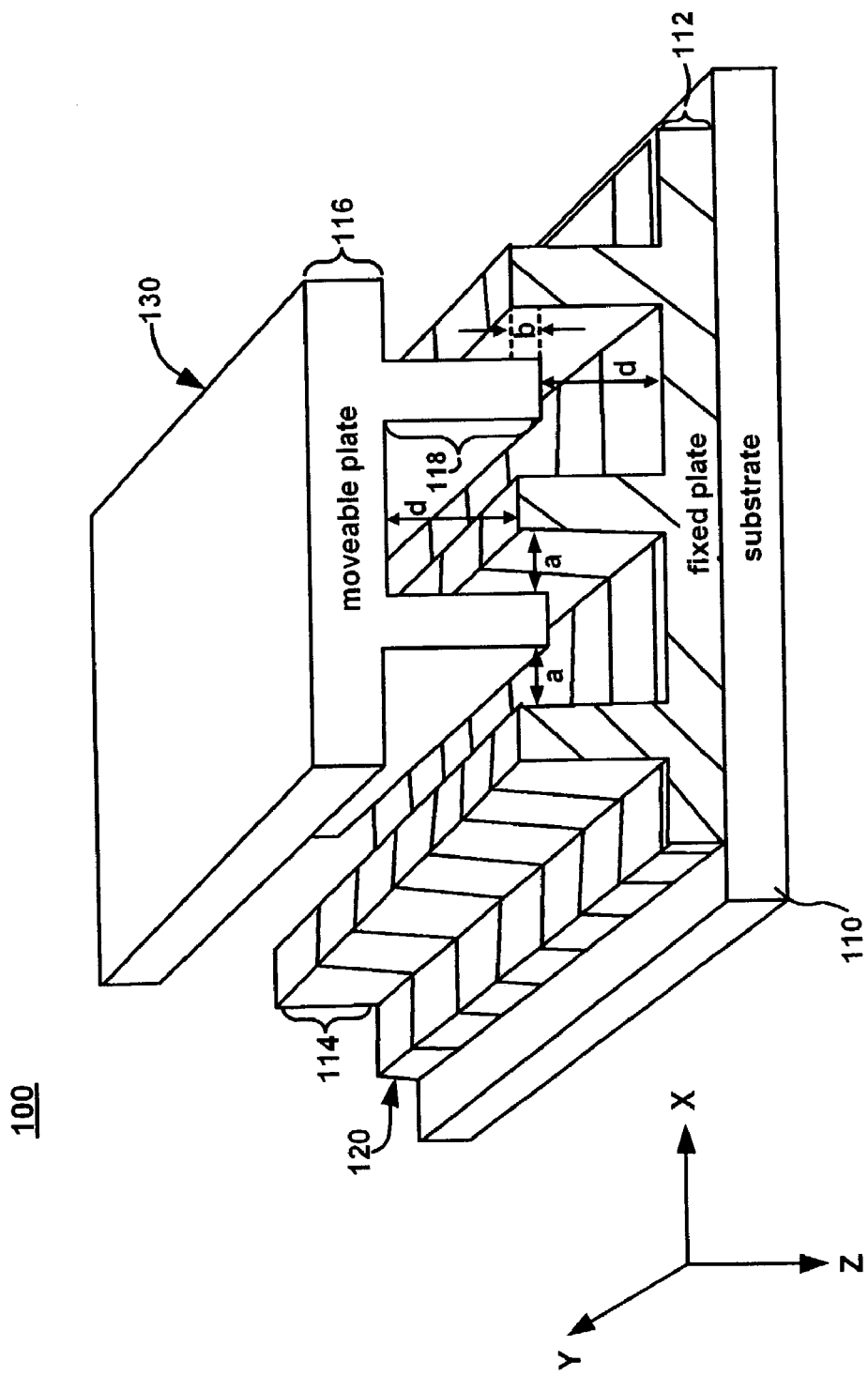
FIG. 1 is a perspective view of a variable capacitor in accordance with a first embodiment of the present invention.

FIG. 1 illustrates a portion of an exemplary variable capacitor 100 in accordance with a first embodiment of the present invention. The movable capacitor electrode 130 of the exemplary variable capacitor 100 has rigidity-increasing features that increase the resistance of the movable capacitor electrode 130 to bending. The more rigid movable capacitor electrode 130 will not bend as easily as a conventional flat-plate capacitor when subjected to stresses such as those encountered during fabrication. The more rigid movable capacitor electrode 130 will not bend as easily as a conventional flat-plate capacitor during use.

The rigidity-increasing features of the movable capacitor electrode 130 also provide a capacitance-increasing topography. Furthermore, the fixed capacitor electrode 120 includes capacitance-increasing features. Thus, the major surfaces of the capacitor electrodes 120, 130 of the variable capacitor 100 have a capacitance-increasing topography. For the purposes of the present application the term "capacitance-increasing topography" means that the maximum effective area of the juxtaposed surfaces of the two capacitor electrodes 120, 130 is greater than the chip area occupied by the variable capacitor 100. Conductive protuberances of the major surfaces of the exemplary variable capacitor 100 provide the capacitance-increasing topography.

Still referring to FIG. 1, the protuberances extending from the movable and fixed capacitor electrodes 120, 130 define recesses. For the purposes of the present application, the term "recess" means a region of a capacitor electrode 120, 130 located opposite a protuberance on the other capacitor electrode 120, 130 and shaped to accommodate the protuberance without the capacitor electrodes 120, 130 touching each other. Thus, both the movable and fixed capacitor electrodes 120, 130 are shaped to define a number of complementary interleaved protuberances and recesses. These protuberances and recesses increase the maximum effective overlapping area of the capacitor electrodes 120, 130 that oppose each other, relative to a conventional flat parallel-plate capacitor. Thus, the present embodiment has a greater capacitance than a conventional flat parallel-plate capacitor that occupies the same chip area.

Figure 3:
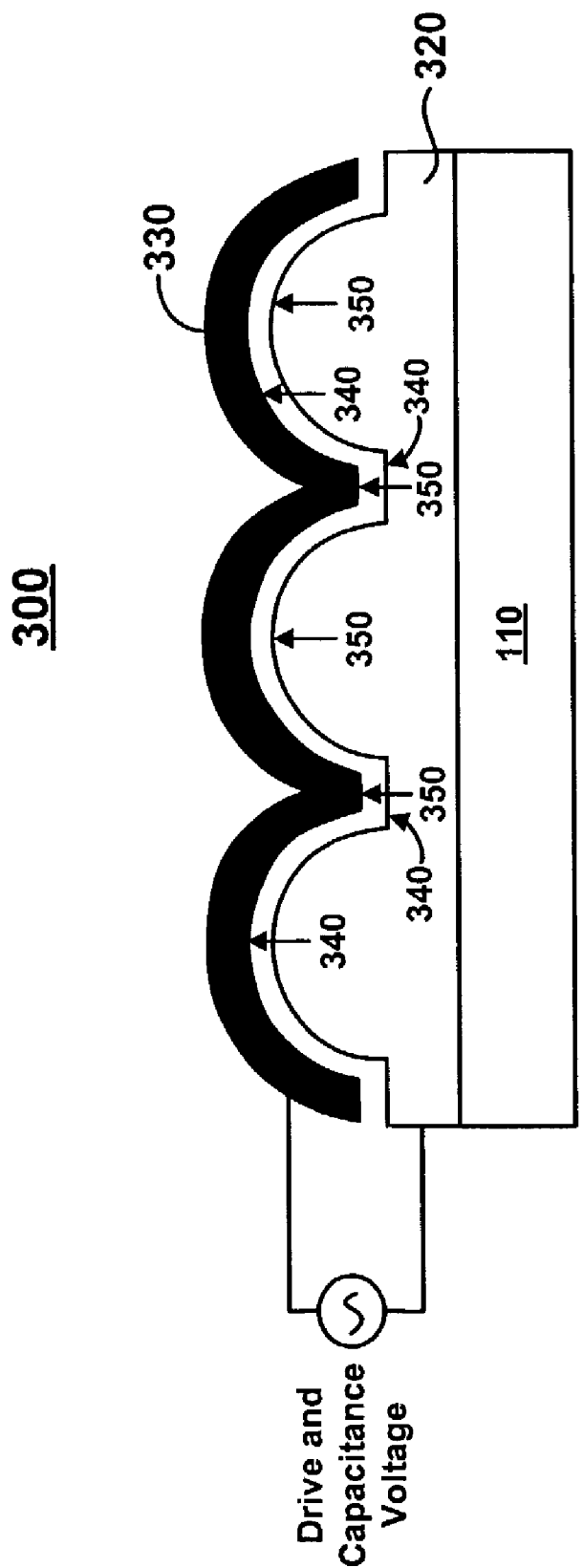
FIG. 3 is a side view of a variable capacitor in accordance with a second embodiment of the present invention.
Figure 4A:
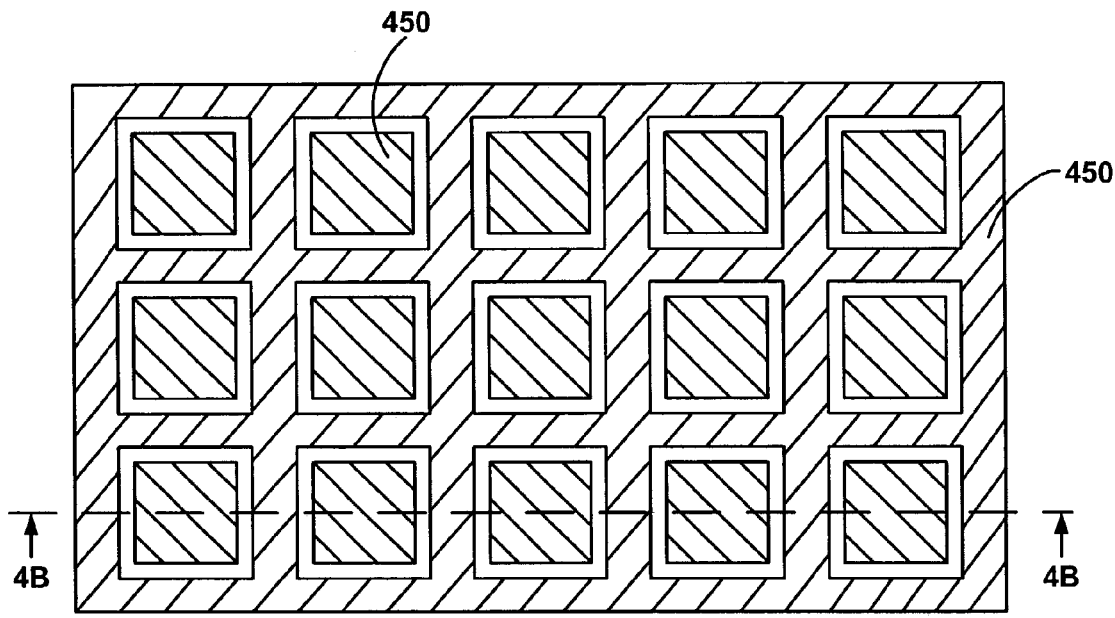
FIG. 4A is a cross-sectional view illustrating capacitor electrode features in a waffle-pattern taken along section line 4A—4A in FIG. 4B in accordance with an embodiment of the present invention.
Figure 4B:
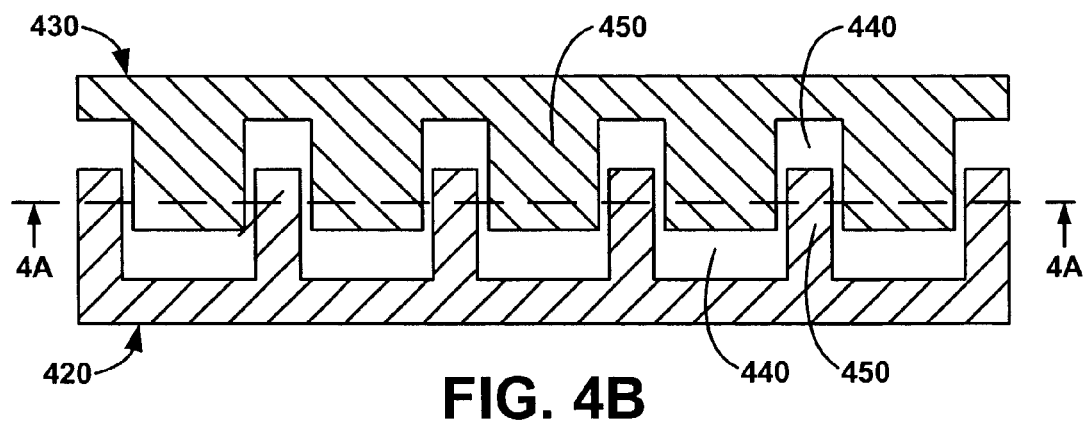
FIG. 4B is a cross-sectional view of the capacitor electrode features taken along line 4B—4B of FIG. 4A in accordance with an embodiment of the present invention.

Referring still to FIG. 1, the exemplary variable capacitor has a fixed capacitor electrode 120 located on the major surface of a substrate 110. The fixed capacitor electrode 120 has a flat portion 112 that is parallel to the substrate 110 and several conductive protuberances 114 that extend orthogonally from the flat portion 112. The exemplary variable capacitor 100 has a movable capacitor electrode 130 with a flat portion 116 that is parallel to the major surface of the substrate 110 and several conductive protuberances 118 that extend orthogonally from the flat portion 116. In the embodiment shown in FIG. 1, the protuberances are fingers. A finger means a protuberance that has at least two surfaces that are orthogonal to the flat portion of the capacitor electrode. However, the present invention is not limited to the protuberances being fingers. The conductive fingers 114, 118 of each capacitor electrode 120, 130 are parallel to each other. Thus, the exemplary variable capacitor 100 is an interdigitated variable capacitor with the fingers 114 of the fixed capacitor electrode 120 variably overlapping the fingers 118 of the movable capacitor electrode 130. However, the invention is not limited to the variable capacitor being an interdigitated capacitor. FIGS. 3–4B illustrate alternative embodiments of a variable capacitor.

The movable capacitor electrode 130 is supported by a system of springs (not shown) that allow the movable capacitor electrode 130 to move in the z-direction towards the fixed capacitor electrode 120 if the z-direction component of the electrostatic force is greater than the opposing force, if any, from the springs. The movable capacitor electrode 130 is moved by applying a control voltage between the movable and fixed capacitor electrodes 130, 120. In operation, as the movable capacitor electrode 130 moves in the z-direction, orthogonal to the major surface of the substrate 110, the separation "a" between the conductive fingers in the x-direction stays constant, but, the overlap "b" in the z-direction increases. In this embodiment, a finger 118 of the movable electrode 130 and the adjacent two fingers 114 of the fixed electrode 120 act as opposing electrodes of a parallel-plate capacitor. Because the capacitance of a parallel-plate capacitor is proportional to the area of the overlapping plates, the capacitance increases as the overlap "b" in the z-direction increases. The shape of the fingers 114, 118 causes an x-direction component of the electrostatic field between the fingers 114 of the fixed capacitor electrode 120 and the fingers 118 of the movable capacitor electrode 130 that contributes to the capacitance between the capacitor electrodes 120, 130, but does not induce snap-together of the capacitor electrodes 120, 130 in the z-direction.

The z-direction component of the electrostatic force produced by the control voltage across gaps "d" increases as the movable capacitor electrode 130 moves in the z-direction due to the reduction of the width of the gaps "d". The z-direction electrostatic force also increases as the control voltage increases, which will be the case as the control voltage is increased to move the capacitor electrodes 120, 130 closer together. Thus, eventually, the z-direction electrostatic force produced by the control voltage across the gaps "d" can become large enough to overcome the force applied by the spring constant of the springs and the capacitor electrodes 120, 130 can snap together. However, the present embodiment provides a greater range of capacitance variation than a conventional flat parallel-plate variable capacitor before snap-together occurs. For example, conventional flat parallel-plate variable capacitors are typically limited to a tuning range or 1.5:1. That is, the capacitance at snap-together is 1.5 times greater than the lowest capacitance. The change in capacitance as the capacitor electrodes 120, 130 are brought together in the present embodiment is mostly due to the increase in the overlap "b". The increase in capacitance before snap-together is thus a function of the overlap of the fingers. It is possible to create a much greater capacitance range with the embodiment of FIG. 1 than conventional flat parallel-plate variable capacitors. For example, the embodiment of FIG. 1 has a tuning range of at least 1.8:1. That is, the capacitance at snap-together is at least 1.8 times greater than the lowest capacitance.

The rigidity-increasing feature of the movable electrode 130 also reduces snap-together of the capacitor electrodes 120, 130. First, the rigidity-increasing features reduce the likelihood that movable electrode 130 will deform during fabrication of the tunable capacitor. Second, the rigidity-increasing features of the movable electrode 130 reduce the tendency of the movable capacitor electrode 130 to bend during capacitor usage. Because the movable capacitor electrode 130 is less likely to deform during fabrication and less likely to bend during use, snap-together of the movable capacitor electrode 130 and the fixed capacitor electrode 120 is reduced. Further, reducing snap-together increases the tuning range of the capacitor.

The variable capacitor 100 of FIG. 1 is fabricated by surface-micromachining. The material of the substrate 110 is silicon in this embodiment. However, the material for the substrate 110 can be any suitable material that will serve as a platform for the variable capacitor 100. The present invention is not limited to fabricating the variable capacitor 100 by surface-micromachining. In another embodiment, the variable capacitor 100 fabricating by bulk-micromachining, in which the variable capacitor 100 is fabricated in the substrate. A bulk-micromachined variable capacitor is fabricated by deep reactive ion etching, in one embodiment. The present invention is not limited to fabricating the variable capacitor 100 by micromachining.

In the embodiment of FIG. 1, the region between the fixed capacitor electrode 120 and the movable capacitor electrode 130 comprises a gap. The gap is typically filled with ambient air but may alternatively be another gas or evacuated. In another embodiment, a dielectric material resides on the major surface of at least one of the fixed capacitor electrode 120 or the movable capacitor electrode 130.

Figure 2:
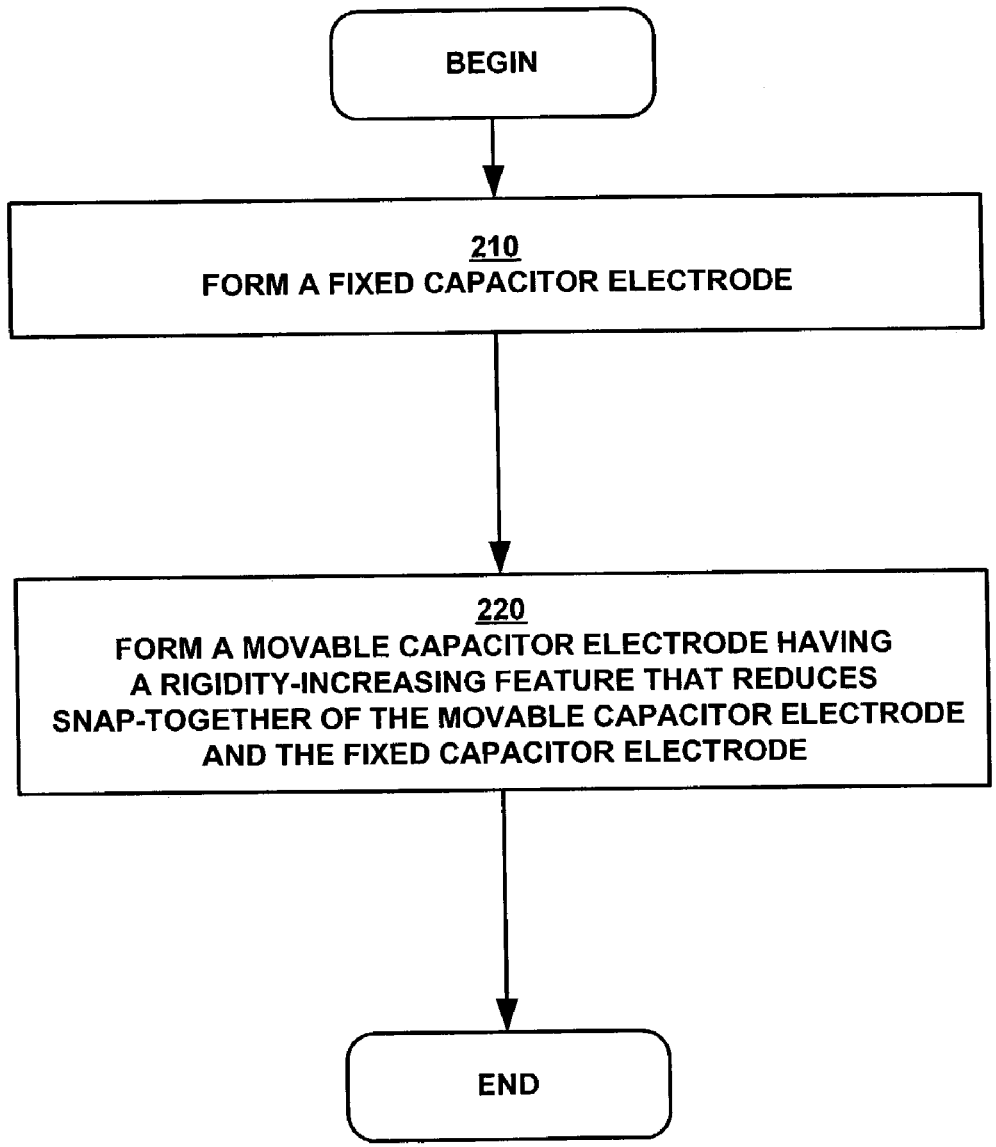
FIG. 2 is a flowchart illustrating a process for reducing snap-together in a variable capacitor in accordance with an embodiment of the present invention.

FIG. 2 is a flowchart illustrating a process 200 for reducing snap-together in a variable capacitor according to an embodiment the present invention. Reducing snap-together increases the tuning range of the capacitor. In block 210, a fixed capacitor electrode is formed. The fixed capacitor electrode has at least one capacitance-increasing feature coupled to the fixed capacitor electrode, in one embodiment. In one embodiment, block 210 comprises depositing an insulating layer of silicon nitride on a silicon substrate. Then, the layer of silicon nitride is electroplated with a layer of gold. Next, photoresist is deposited on the gold. After patterning and removing portions of the photoresist, protuberances are formed by electroplating a layer of gold in the removed portions of the photoresist. The remainder of the photoresist is then removed to create recesses between the protuberances. The protuberances constitute the capacitance-increasing features of the fixed capacitor electrode. The present invention is not limited to forming the fixed capacitor electrode by surface-micromachining. In another embodiment, the fixed capacitor electrode is formed by bulk-micromachining.

In block 220, a movable capacitor electrode having a rigidity-increasing feature that reduces snap-together of the movable capacitor electrode and the fixed capacitor electrode is formed. In one embodiment, a conformal layer of silicon dioxide ($SiO_2$) is deposited on the fixed capacitor electrode. In one embodiment, the $SiO_2$ is deposited on the fixed capacitor electrode by plasma-enhanced chemical vapor deposition (PECVD). The conformal layer of $SiO_2$ serves as a base upon which the movable capacitor electrode will be formed and is removed later in the process 200. In one embodiment, the movable electrode is formed by electroplating gold over the conformal layer of $SiO_2$. The electroplating forms the movable capacitor electrode with protuberances that extend into the recesses of the fixed capacitor electrode covered by the conformal layer of $SiO_2$. The layer of gold comprises the various protuberances (FIG. 1, 118) and the flat portion (FIG. 1, 116) orthogonal to the protuberances 118. The fixed capacitor electrode is then released from the movable capacitor electrode. In one embodiment, the release is achieved by etching away the conformal layer of $SiO_2$. The $SiO_2$ is removed by etching with hydrofluoric acid (HF), in one embodiment. Releasing the fixed capacitor electrode from the movable capacitor electrode forms a gap that is typically filled with ambient air but may alternatively be another gas or evacuated. Thus, the movable capacitor electrode is formed with at least one rigidity-increasing feature that reduces snap-together of the movable electrode and the fixed electrode. The rigidity-increasing feature further provides a capacitance-increasing topography.

FIG. 3 shows an exemplary variable capacitor 300 in accordance with another embodiment of the invention. In the present embodiment, the movable capacitor electrode 330 and fixed capacitor electrode 320 each have a number of interleaved protuberances 350 and recesses 340. The protuberances 350 and recesses 340 increase the area of the major surface of the movable capacitor electrode 330 and the area of the major surface of the fixed capacitor electrode 320 relative to the chip area occupied by the variable capacitor 300. Thus, a greater capacitance is achieved than conventional flat parallel-plate capacitors occupying the same chip area. The protuberances 350 also increase the rigidity of the movable capacitor electrode and, hence, the resistance of the movable capacitor electrode 330 to bending. Thus, the distance between the capacitor electrodes 320, 330 is more uniform and predictable than in conventional variable capacitors. The protuberances 350 and recesses 340 also reduce snap-together of the movable capacitor electrode 330 and the fixed capacitor electrode 320. Snap-together is reduced because the rigidity of the movable capacitor electrode 330 reduces bending that could otherwise cause the capacitor electrodes 320, 330 to contact one another. Snap-together is also reduced because the shape of the protuberances provides an x-component component of the electrostatic force that contributes to the capacitance between the capacitor electrodes while not forcing the capacitor electrodes together in the z-direction. Many shapes are possible for the recesses 340 and protuberances 350 to achieve rigidity-increasing features for the movable capacitor electrode 330 and to achieve a capacitance-increasing topography for the variable capacitor 300.

Still referring to FIG. 3, a control voltage is applied between the fixed capacitor electrode 320 and the movable capacitor electrode 350 to adjust the distance therebetween.

Increasing the magnitude of the control voltage narrows the gap between the movable capacitor electrode 330 and the fixed capacitor electrode 320. The capacitance voltage is provided by a circuit (not shown) to which the capacitor electrodes 320, 330 are coupled. Drive circuits are known in the art and are therefore not described.

In another embodiment of the invention, the protuberances and recesses are arranged in a waffle pattern. FIGS. 4A and 4B illustrate a pattern of protuberances and recesses for the fixed electrode 420 and the movable electrode 430, in accordance with one embodiment of the invention. FIG. 4B is a cross-sectional view along line 4B—4B in FIG. 4A. FIG. 4A is a cross-sectional view along line 4A—4A of FIG. 4B. In the embodiment of FIGS. 4A–4B, the protuberances 450 of the movable capacitor electrode 430 are cube-shaped and fit into cube-shaped recesses 440 of the fixed capacitor electrode 420. Also shown are the recesses 440 of the moveable capacitor electrode 430 and the protuberances 450 of the fixed capacitor electrode 420. In an alternative embodiment, cube-shaped protuberances of the fixed electrode fit into cube-shaped recesses of the movable electrode. In still another embodiment, the protuberances of the fixed electrode and the recesses of the movable electrode are hemispherical. Many other shapes are possible for the protuberances and recesses to provide rigidity-increasing features for the movable capacitor electrode and a capacitance-increasing topography for the variable capacitor. Further, many other shapes are possible for the rigidity-increasing features to reduce snap-together of the fixed capacitor electrode and the movable capacitor electrode. Furthermore, many other patterns of locating the protuberances and recesses are possible to provide rigidity-increasing features for the movable capacitor electrode and a capacitance-increasing topography for the variable capacitor.

While the present invention has been described in particular embodiments, it should be appreciated that the present invention should not be construed as limited by such embodiments, but rather construed according to the below claims.

What is claimed is:

1. A variable capacitor comprising:
   a movable capacitor electrode including a major surface, said major surface having a first axis that is not a minor axis; and
   a fixed capacitor electrode including a major surface opposite said major surface of said movable capacitor electrode and separated therefrom by a gap, wherein size of said gap is adjustable by a control voltage applied between said movable capacitor electrode and said fixed capacitor electrode;
   wherein said major surface of said movable capacitor electrode includes a rigidity-increasing feature parallel to said first axis to reduce flexing along said first axis, said rigidity-increasing feature additionally providing a capacitance-increasing topography and reducing snap-together of said movable capacitor electrode and said fixed capacitor electrode.

2. The variable capacitor of claim 1, wherein said major surface of said fixed capacitor electrode includes a capacitance-increasing feature.

3. The variable capacitor of claim 2, wherein said capacitance-increasing feature additionally reduces snap-together.

4. The variable capacitor of claim 3, wherein said rigidity-increasing feature of said movable capacitor electrode and said capacitance-increasing feature of said fixed capacitor electrode comprise interdigitated fingers.

5. The variable capacitor of claim 3, wherein said rigidity-increasing feature of said movable capacitor electrode and said capacitance-increasing feature of said fixed capacitor electrode form a waffle pattern.

6. The variable capacitor of claim 3, wherein said rigidity-increasing feature of said movable capacitor electrode and said capacitance-increasing feature of said fixed capacitor electrode are hemispherical.

7. The variable capacitor of claim 1, further comprising a solid dielectric layer on at least one of said major surface of said fixed capacitor electrode and said major surface of said movable capacitor electrode.

8. A variable capacitor as recited in claim 1, wherein said first axis is a major axis.

9. A variable capacitor as recited in claim 1, wherein said first axis is substantially the same length as a second axis of said major surface.

10. A variable capacitor comprising:
    a movable capacitor electrode comprising protuberances and recesses therebetween, wherein said movable capacitor electrode protuberances are substantially perpendicular to a major surface of said movable capacitor electrode that is parallel to a substrate; and
    a fixed capacitor electrode formed on said substrate opposite said movable capacitor electrode and comprising protuberances and recesses therebetween, wherein said fixed capacitor electrode protuberances are substantially perpendicular to a major surface of said fixed capacitor electrode that is parallel to said substrate.

11. The variable capacitor of claim 10, wherein said protuberances of said movable capacitor electrode and said protuberances of said fixed capacitor electrode comprise interdigitated fingers.

12. The variable capacitor of claim 10, wherein said protuberances of said movable capacitor electrode and said protuberances of said fixed capacitor electrode are shaped to reduce snap-together of said movable capacitor electrode and said fixed capacitor electrode.

13. The variable capacitor of claim 10, wherein said recesses and said protuberances of said movable capacitor electrode form a waffle pattern.

14. The variable capacitor of claim 10, wherein said protuberances of said movable capacitor electrode are hemispherical.

15. The variable capacitor of claim 10, wherein said protuberances of said movable capacitor electrode increase the rigidity of said movable capacitor electrode.

16. The variable capacitor of claim 10, wherein said protuberances of said movable capacitor electrode provide a capacitance-increasing topography.

* * * * *

UNITED STATES PATENT AND TRADEMARK OFFICE
CERTIFICATE OF CORRECTION

| | |
|---|---|
| PATENT NO. | : 7,006,342 B2 |
| APPLICATION NO. | : 10/458005 |
| DATED | : February 28, 2006 |
| INVENTOR(S) | : Williams et al. |

It is certified that error appears in the above-identified patent and that said Letters Patent is hereby corrected as shown below:

On the face page, in field (56), under "Other Publications", in column 2, line 13, delete "Microw ave" and insert - - Microwave - -, therefor.

Signed and Sealed this

First Day of August, 2006

JON W. DUDAS
*Director of the United States Patent and Trademark Office*